United States Patent
Cho (10) Patent No.: US 9,252,985 B2
(45) Date of Patent: **\*Feb. 2, 2016**

(54) IMPEDANCE MATCHING BETWEEN FPGA AND MEMORY MODULES

(75) Inventor: Byungcheol Cho, Seochogu (KR)

(73) Assignee: TAEJIN INFO TECH CO., LTD, Seoul (KR)

( * ) Notice: Subject to any disclaimer, the term of this patent is extended or adjusted under 35 U.S.C. 154(b) by 113 days.

This patent is subject to a terminal disclaimer.

(21) Appl. No.: 13/079,172

(22) Filed: Apr. 4, 2011

(65) Prior Publication Data

US 2012/0250436 A1    Oct. 4, 2012

(51) Int. Cl.
*G06F 13/40* (2006.01)
*H04L 25/02* (2006.01)

(52) U.S. Cl.
CPC .................................. *H04L 25/0278* (2013.01)

(58) Field of Classification Search
USPC .......................................................... 711/5
See application file for complete search history.

(56) References Cited

U.S. PATENT DOCUMENTS

| 2002/0080883 | A1* | 6/2002 | Tamura et al. | 375/257 |
| 2004/0061147 | A1* | 4/2004 | Fujita et al. | 257/232 |
| 2008/0313364 | A1* | 12/2008 | Flynn et al. | 710/31 |
| 2009/0313410 | A1* | 12/2009 | Jeong et al. | 710/300 |
| 2012/0054420 | A1 | 3/2012 | Kang et al. | |

FOREIGN PATENT DOCUMENTS

| KR | 2002-0092679 | * | 12/2002 |
| KR | 2002-0092679 | A | 12/2002 |
| KR | 2012-0022065 | A | 3/2012 |

* cited by examiner

*Primary Examiner* — Min Huang
(74) *Attorney, Agent, or Firm* — Saliwanchik, Lloyd & Eisenschenk (57) ABSTRACT

Embodiments of the present invention provide impedance matching between a Field Programmable Gate Array (FPGA) and memory modules in a semiconductor storage device (SSD) system architecture. Specifically, a set (at least one) of memory modules is coupled to an FPGA. A damping resistor is placed at the impedance mismatching point to reduce signal noise.

15 Claims, 7 Drawing Sheets

FIG. 7 ns of the FPGA according to an embodiment of the present
IMPEDANCE MATCHING BETWEEN FPGA AND MEMORY MODULES

CROSS-REFERENCE TO RELATED APPLICATION

This application is related in some aspects to commonly-owned, co-pending application Ser. No. 12/758,937, entitled SEMICONDUCTOR STORAGE DEVICE", filed on Apr. 13, 2010, the entire contents of which are herein incorporated by reference.

FIELD OF THE INVENTION

The present invention relates to impedance matching between a Field Programmable Gate Array (FPGA) and memory modules in a semiconductor storage device (SSD) system architecture.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be properly utilized.

SUMMARY OF THE INVENTION

Embodiments of the present invention provide impedance matching between a Field Programmable Gate Array (FPGA) and memory modules in a semiconductor storage device (SSD) system architecture. Specifically, a set of memory modules is coupled to an FPGA. A damping resistor is placed at the impedance mismatching point to reduce signal noise.

A first aspect of the present invention provides a data storage device in a semiconductor storage device (SSD) system architecture, comprising: a controller board coupled to a set (at least one) of memory modules by a transmission channel configured to communicate data using a digital transmission standard; and a damping resistor at the location of the impedance mismatch along the transmission channel to reduce signal noise.

A second aspect of the present invention provides a method for providing a data storage device in a semiconductor storage device (SSD) system architecture, comprising: coupling a controller board to a set (at least one) of memory modules by a transmission channel configured to communicate data using a digital transmission standard; and coupling a damping resistor to the transmission channel at the location of the impedance mismatch to reduce signal noise.

A third aspect of the present invention provides a method for matching impedance to reduce signal noise in a semiconductor storage device (SSD) system architecture with an impedance match circuit operatively coupled between a controller board and a set (at least one) of memory modules.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance. The term SSD means semiconductor storage device. The term DDR means double data rate. Still yet, the term HDD means hard disk drive.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of an I/O standard such as a serial attached small computer system interface (SAS)/serial advanced technology attachment (SAIA) type according to an embodiment will be described in detail with reference to the accompanying drawings.

As indicated above, embodiments of the present invention provide a DDR memory system for a multi-level RAID architecture. Specifically, embodiments of this invention provide a main RAID controller coupled to a system control board. Main RAID controller 802 is self-contained, meaning it has its own firmware to enable booting from an SSD. Coupled to the main RAID controller is a set of double data rate (DDR) RAID subcontrollers. A set of DDR RAID control blocks is coupled to each of the set of DDR RAID controllers, each of the set of DDR RAID control blocks include a set of DDR memory disks.

The storage device of an I/O standard such as a serial attached small computer system interface (SAS) serial advanced technology attachment (SATA) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Figure 1:
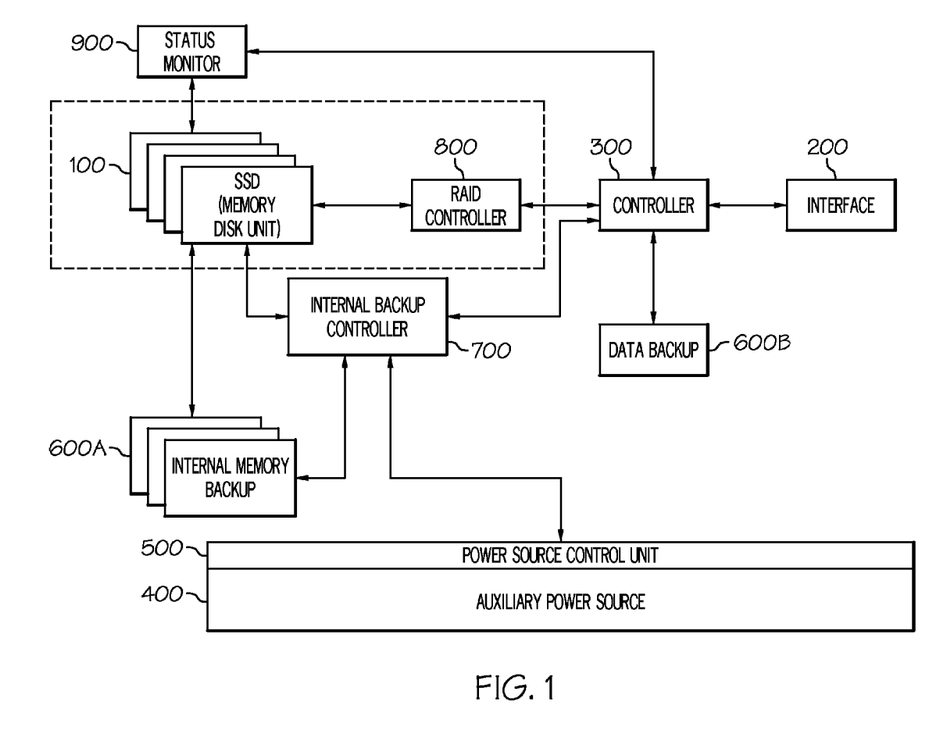
FIG. 1 is a diagram schematically illustrating a configuration of a RAID controlled storage device of a PCI-Express (PCI-e) type according to an embodiment of the present invention.

Referring now to FIG. 1, a diagram schematically illustrating a configuration of a PCI-Express type, RAID controlled storage device (e.g., for providing storage for a serially attached computer device) according to an embodiment of the invention is shown. As depicted, FIG. 1 shows a RAID controlled PCI-Express type storage device according to an embodiment of the invention which includes a memory disk unit 100 comprising: a plurality of memory disks having a plurality of volatile semiconductor memories (also referred to herein as high-speed SSDs 100); a RAID controller 800 coupled to SSDs 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit 600A-B that stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller unit 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

As depicted, a PCI-e type RAID controller 800 can be directly coupled to any quantity of SSDs 100. Among other things, this allows for optimum control of SSDs 100. Among other things, the use of a RAID controller 800:

1. Supports the current backup/restore operations.
2. Provides additional and improved backup function by performing the following:
   a) the internal backup controller determines the backup (user's request order or the status monitor detects power supply problems);
   b) the internal backup controller requests a data backup to SSDs;
   c) the internal backup controller requests an internal backup device to backup data immediately;
   d) monitors the status of the backup for the SSDs and internal backup controller; and
   e) reports the internal backup controller's status and end-op.
3. Provides additional and improved restore function by performing the following:
   a) the internal backup controller determines the restore (user's request order or the status monitor detects power supply problems);
   b) the internal backup controller requests a data restore to the SSDs;
   c) the internal backup controller requests an internal backup device to restore data immediately;
   d) monitors the status of the restore for the SSDs and internal backup controller; and
   e) reports the internal backup controller status and end-op.

Figure 2:
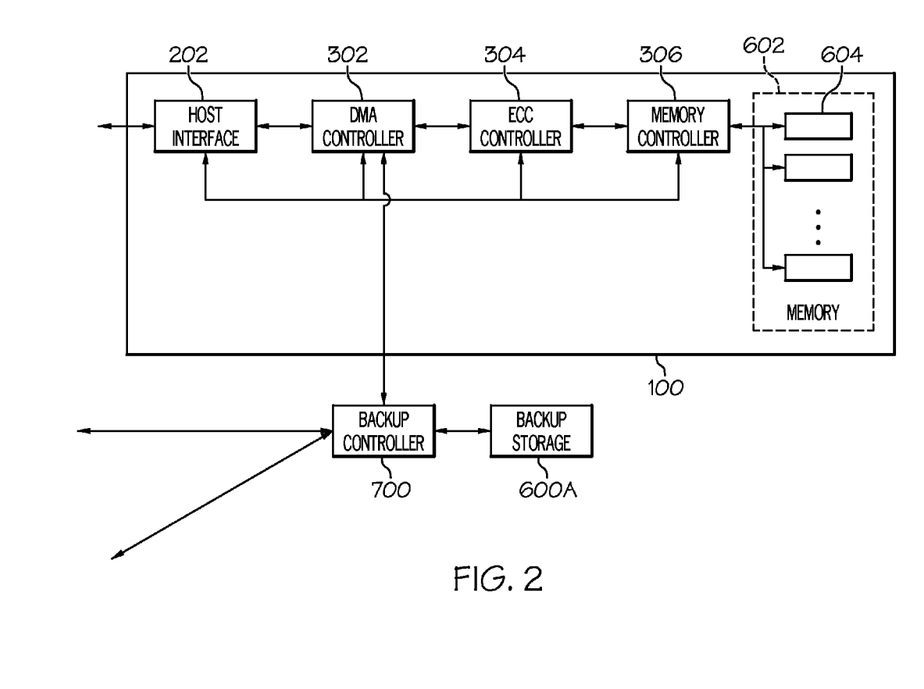
FIG. 2 is a more specific diagram of a RAID controller coupled to a set of SSDs.

Referring now to FIG. 2, a diagram schematically illustrating a configuration of the high-speed SSD 100 is shown. As depicted, SSD/memory disk unit 100 comprises: a host interface 202 (e.g., PCI-Express host) (which can be interface 200 of FIG. 1, or a separate interface as shown); a DMA controller 302 interfacing with a backup control module 700; an ECC controller 304; and a memory controller 306 for controlling one or more blocks 604 of memory 602 that are used as high-speed storage. Also shown are backup controller 700 coupled to DMA controller and backup storage unit 600A coupled to backup controller 700.

In general, DMA is a feature of modern computers and microprocessors that allows certain hardware subsystems within the computer to access system memory for reading and/or writing independently of the central processing unit. Many hardware systems use DMA including disk drive controllers, graphics cards, network cards, and sound cards.

DMA is also used for intra-chip data transfer in multi-core processors, especially in multiprocessor system-on-chips, where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly, a processing element inside a multi-core processor can transfer data to and from its local memory without occupying its processor time and allowing computation and data transfer concurrency.

Without DMA, using programmed input/output (PIO) mode for communication with peripheral devices, or load/store instructions in the case of multi-core chips, the CPU is typically fully occupied for the entire duration of the read or write operation, and is thus unavailable to perform other work. With DMA, the CPU would initiate the transfer, do other operations while the transfer is in progress, and receive an interrupt from the DMA controller once the operation has been done. This is especially useful in real-time computing applications where not stalling behind concurrent operations is critical.

Figure 3:
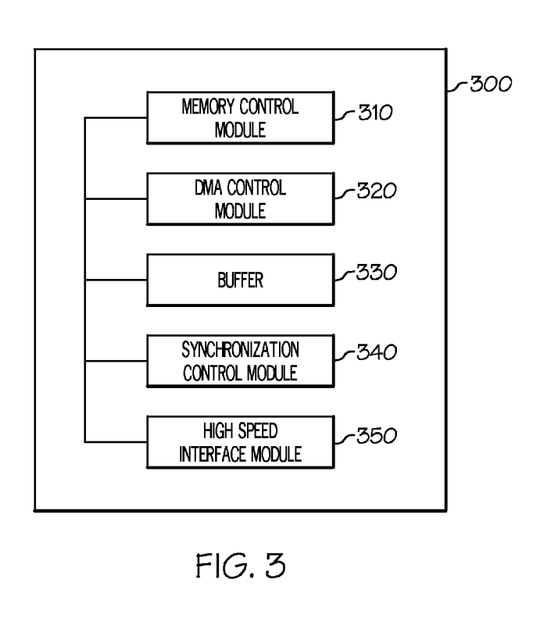
FIG. 3 is a diagram schematically illustrating a configuration of the high-speed SSD of FIG. 1.

Referring now to FIG. 3, the controller unit 300 of FIG. 1 is shown as comprising: a memory control module 310 which controls data input/output of the SSD memory disk unit 100; a DMA control module 320 which controls the memory control module 310 to store the data in the SSD memory disk unit 100, or reads data from the SSD memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the SSD memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the SSD memory disk unit 100 to transmit the synchronized data signal to the SSD memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks.

Figure 4:
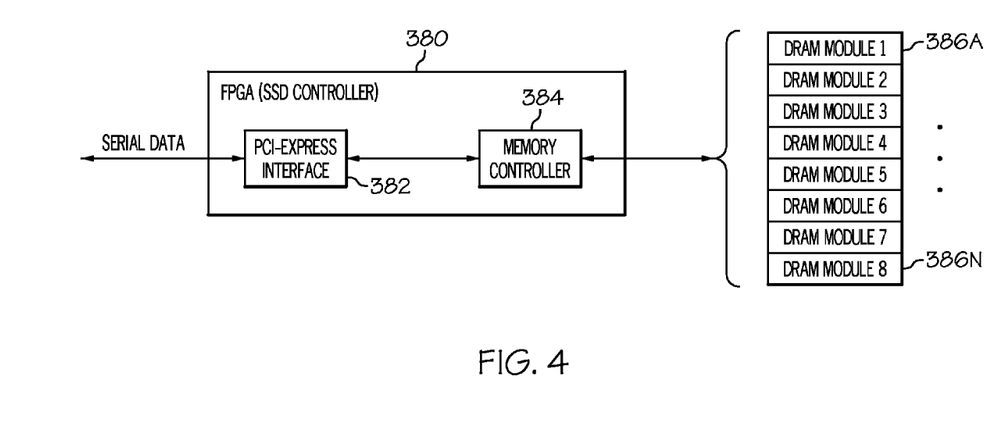
FIG. 4 is a diagram schematically illustrating the components of the FPGA according to an embodiment of the present invention.

Referring now to FIG. 4, a diagram schematically illustrating a system architecture including the FPGA according to an embodiment of the present invention is shown. SSDs 100 (FIG. 1) each include an FPGA. A Field Programmable Gate Array, or FPGA, is a semiconductor device that contains programmable logic and interconnections. Specifically, an FPGA contains programmable logic components called logic elements (LEs) and a hierarchy of reconfigurable interconnects that allow the LEs to be physically connected. The advantage of the FPGA is that the chip is programmable and can be re-programmed with an update. There are fundamental building blocks that comprise a memory interface and controller for an FPGA-based design: the physical layer interface, the memory controller, and the user interface that bridges the memory interface design to the rest of the FPGA design. FPGA 380 consists of PCI-Express interface 382 and memory controller 384. FPGA 380 is coupled to a set (at least one) of semiconductor memory modules (for example, DDR, DDR2, DDR3, SDRAM, DRAM, and the like). As shown in FIG. 4, FPGA 380 is coupled to a set of DRAM memory modules 386A-N. A serial-access procedure is used to configure the FPGA device.

Figure 5:
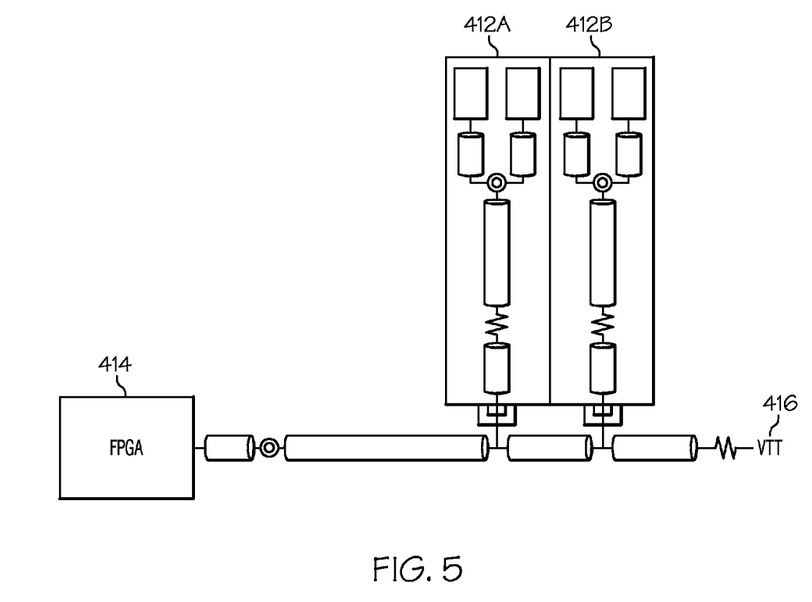
FIG. 5 is a diagram schematically illustrating the connections between the FPGA and memory modules.

Referring now to FIG. 5, a diagram schematically illustrating the connections between the FPGA and the memory modules is shown. As shown, FPGA 414 is connected to two DRAM memory modules 412A-B, along with voltage source (VTT) 416. Dynamic random-access memory (DRAM) is a type of random-access memory that stores each bit of data in a separate capacitor within an integrated circuit. DRAM is dynamic in that it needs to have its storage cells refreshed or given a new electronic charge every few milliseconds.

Figure 6:
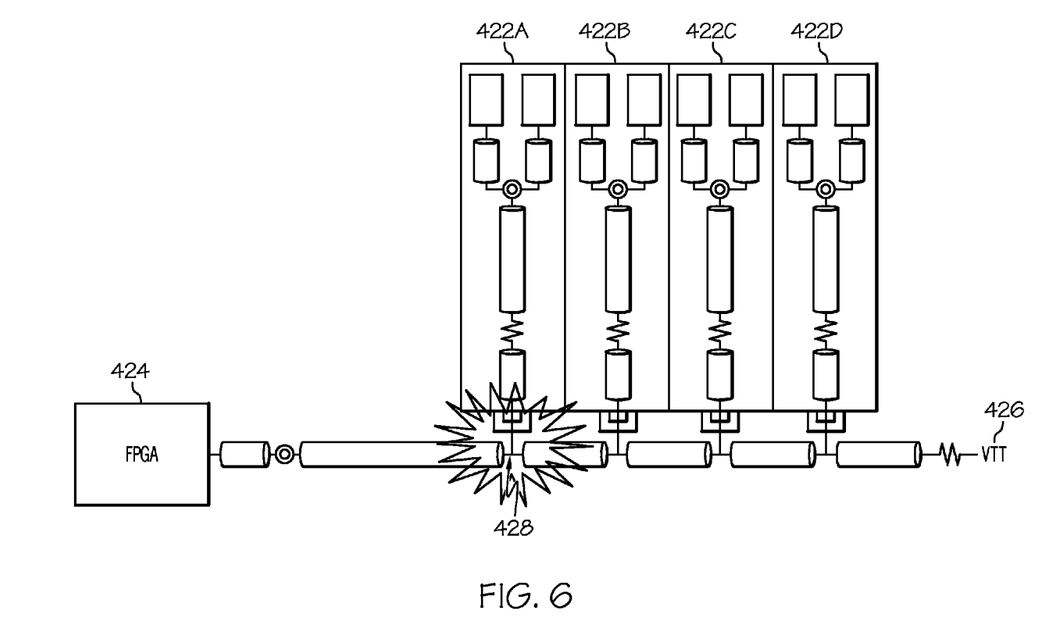
FIG. 6 is a diagram schematically illustrating signal noise along the connection.

Referring now to FIG. 6, a diagram schematically illustrating signal noise along the connection is shown. FPGA 424 is coupled to memory modules (e.g., DRAM) 422A-D, along with voltage source (VTT) 426. Signal noise 428 along the transmission circuit is depicted. Electronic noise is a random fluctuation in an electrical signal, a characteristic of all electronic circuits. Signal transmission may be adversely affected by external noise and signal reflection. Signal reflection occurs when a signal is transmitted along a transmission medium and some of the signal power is be reflected back to its origin rather than being carried all the way along the transmission medium to the far end.

Any device which generates a voltage has what is called an output impedance (i.e., the impedance value of its own internal circuitry as measured across its outputs). Similarly, any device which expects to receive a voltage input has an input impedance as measured across the inputs. In cases where it is necessary to transfer the maximum power from a source to a destination, the output impedance of the source and the input impedance of the destination must be equal. This situation is referred to as having matched impedances. If the source and destination impedances are unmatched then some of the energy being transferred from source to destination is being reflected back from the destination (or wherever there is an impedance mismatch in the connecting circuit) towards the source. The portion of the transmission circuit where impedance mismatch occurs is referred to as the impedance mismatching point.

Figure 7:
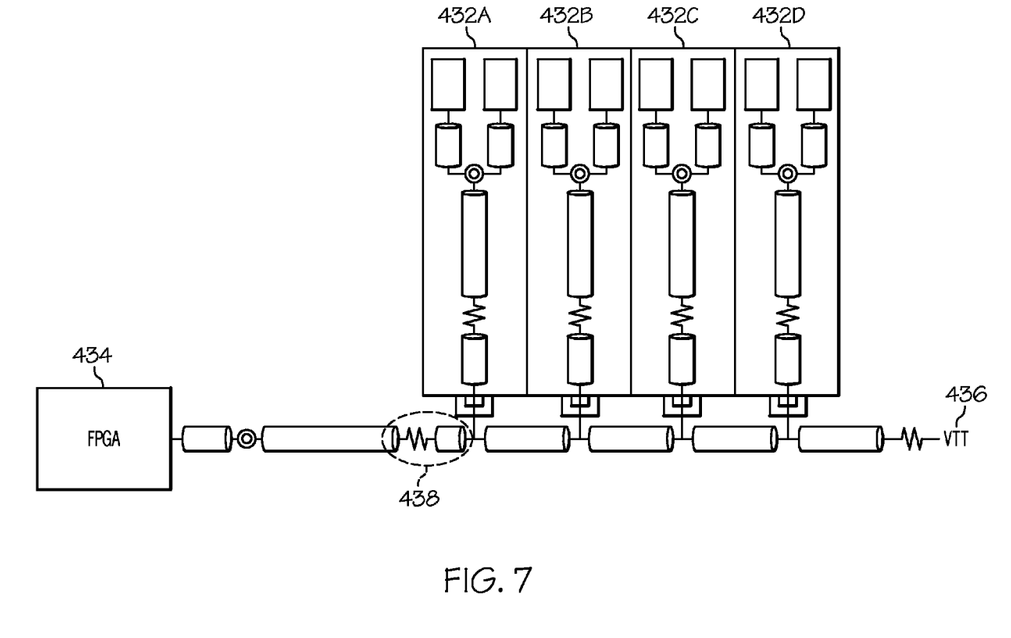
FIG. 7 is a diagram schematically illustrating the damping resistor at the impedance mismatch point.

Referring now to FIG. 7, a diagram schematically illustrating the damping resistor at the impedance mismatching point is shown. FPGA 434 is coupled to memory modules (e.g., DRAM) 432A-D, along with voltage source (VTT) 436. A damping resistor is placed at impedance mismatching point 438. The damping resistor is placed on the transmission circuit to damp out (i.e., reduce) signal reflections which adversely affect system performance by degrading signal quality.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the memory disk unit 100, the backup storage unit 600, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit 600A-B is configured as a low-speed non-volatile storage device such as a hard disk and stores data of the memory disk unit 100.

The backup control unit 700 backs up data stored in the memory disk unit 100 in the backup storage unit 600 by controlling the data input/output of the backup storage unit 600 and backs up the data stored in the memory disk unit 100 in the backup storage unit 600 according to an instruction from the host, or when an error occurs in the power source of the host due to a deviation of the power transmitted from the host deviates from the threshold value.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The present invention supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A data storage device in a semiconductor storage device (SSD) system architecture, comprising:
   a controller board coupled to a set of memory modules by a transmission channel configured to communicate data using a digital transmission standard; and
   a damping resistor connecting in a three-way manner with the controller board, the set of memory modules, and a voltage source that is externally connected to the controller board;
   wherein each memory module of the set of memory modules and the voltage source are disposed on one side of the damping resistor along the transmission channel and the controller board is disposed on the other side of the damping resistor along the transmission channel; and
   wherein the controller board comprises a programmable integrated circuit and the damping resistor is configured to match configurable impedance of the programmable integrated circuit of the controller board with both impedance of the whole set of memory modules and impedance of the voltage source, such that signal noise at the three-way connection is reduced.

2. The data storage device of claim 1, wherein the memory modules comprise dynamic random access memory (DRAM) modules.

3. The data storage device of claim 1, the controller board comprising:
   a high-speed interface; and
   a controller that is arranged and configured to received commands from a host using the high-speed interface and to execute the command.

4. The data storage device of claim 3, where the controller is a field programmable gate array (FPGA) controller.

5. The data storage device of claim 3, wherein the high-speed interface is a PCI-e interface.

6. A method for providing a data storage device in a semiconductor storage device (SSD) system architecture, comprising:
   coupling a controller board to a set of memory modules by a transmission channel configured to communicate data using a digital transmission standard; and
   connecting a damping resistor in a three-way manner with the controller board, the set of memory modules, and a voltage source that is externally connected to the controller board;
   wherein each memory module of the set of memory modules and the voltage source are disposed on one side of the damping resistor along the transmission channel and the controller board is disposed on the other side of the damping resistor along the transmission channel; and
   wherein the controller board comprises a programmable integrated circuit and the damping resistor is configured to match configurable impedance of the programmable integrated circuit of the controller board with both impedance of the whole set of memory modules and impedance of the voltage source, such that signal noise at the three-way connection is reduced.

7. The method of claim 6, wherein the memory modules comprise dynamic random access memory (DRAM) modules.

8. The method claim 6, the controller board comprising:
   a high-speed interface; and
   a controller that is arranged and configured to received commands from a host using the high-speed interface and to execute the command.

9. The method of claim 8, where the controller is a field programmable gate array (FPGA) controller.

10. The method of claim 8, wherein the high-speed interface is a PCT-e interface.

11. A method for matching impedance to reduce signal noise in a semiconductor storage device (SSD) system architecture comprising a step of connecting a damping resistor in a three-way manner with a controller board, a set of memory modules, and a voltage source that is externally connected to the controller board;
   wherein each memory module of the set of memory modules and the voltage source are disposed on one side of the damping resistor along a transmission channel and the controller board is disposed on the other side of the damping resistor along the transmission channel; and
   wherein the controller board comprises a programmable integrated circuit and the damping resistor is configured to match configurable impedance of the programmable integrated circuit of the controller board with both impedance of the whole set of memory modules and impedance of the voltage source, such that signal noise at the three-way connection is reduced.

12. The method of claim 11, the memory modules comprise dynamic random access memory (DRAM) modules.

13. The method of claim 11, the controller board comprising:
- a high-speed interface and
- a controller that is arranged and configured to receive commands from a host using the high-speed interface and to execute the command.

14. The method of claim 13, wherein the controller is a field programmable gate array (FPGA) controller.

15. The method of claim 13, wherein the high-speed interface is a PCI-e interface.

* * * * *